(12) United States Patent
Borkholder

(10) Patent No.: US 12,397,598 B1
(45) Date of Patent: Aug. 26, 2025

(54) WEIGHT DISTRIBUTION HITCH

(71) Applicant: Gen-Y Creations, LLC, Nappanee, IN (US)

(72) Inventor: Carl J. Borkholder, Nappanee, IN (US)

(73) Assignee: Gen-Y Creations, LLC, Nappanee, IN (US)

( * ) Notice: Subject to any disclaimer, the term of this patent is extended or adjusted under 35 U.S.C. 154(b) by 0 days.

(21) Appl. No.: 19/088,436

(22) Filed: Mar. 24, 2025

(51) Int. Cl.
*B60D 1/32* (2006.01)
*B60D 1/06* (2006.01)
*B60D 1/24* (2006.01)

(52) U.S. Cl.
CPC ............. *B60D 1/327* (2013.01); *B60D 1/06* (2013.01); *B60D 1/247* (2013.01)

(58) Field of Classification Search
CPC ...................................... B60D 1/327
See application file for complete search history.

(56) References Cited

U.S. PATENT DOCUMENTS

| | | | | |
|---|---|---|---|---|
| 3,305,246 | A * | 2/1967 | Gonczy ............ | B60D 1/30 280/455.1 |
| 3,659,874 | A * | 5/1972 | Rendessy ........... | B60D 1/327 280/455.1 |
| 3,871,686 | A * | 3/1975 | Rendessy ........... | B60D 1/32 280/455.1 |
| 4,017,977 | A * | 4/1977 | Light ................. | G01B 7/30 33/193 |
| 5,016,899 | A * | 5/1991 | Euteneier .......... | B60D 1/32 280/446.1 |
| 5,085,408 | A * | 2/1992 | Norton .............. | B60D 1/38 280/477 |
| 5,195,768 | A * | 3/1993 | Hendrix ............ | B60T 11/107 280/446.1 |
| 5,375,867 | A | 12/1994 | Kass et al. | |
| 5,407,220 | A * | 4/1995 | Fischer ............. | B60D 1/32 280/446.1 |
| 5,984,341 | A | 11/1999 | Kass et al. | |
| 6,945,744 | B1 * | 9/2005 | Swanson ........... | B60P 1/025 414/482 |
| 6,951,345 | B2 * | 10/2005 | Wilks ............... | B60D 1/38 254/326 |
| 8,186,702 | B2 | 5/2012 | McCoy et al. | |
| 10,960,720 | B2 * | 3/2021 | Yamada ............. | B60D 1/481 |
| 11,247,518 | B1 | 2/2022 | Works et al. | |

(Continued)

FOREIGN PATENT DOCUMENTS

| | | | | |
|---|---|---|---|---|
| AT | | 508026 B1 * | 10/2010 | ............ B60D 1/145 |
| FR | | 2630973 A1 * | 11/1989 | |

*Primary Examiner* — Kevin Hurley
(74) *Attorney, Agent, or Firm* — Sanders Pianowski LLP

(57) ABSTRACT

A weight distribution hitch has a portion that is affixed to a trailer and a vehicle portion that is affixed adjacent to a hitch ball on a towing vehicle. A cable with a spring element extends between the trailer portion and vehicle portion, with the ends of the cable being attached to the trailer portion. The cable passes through the vehicle portion at a point below the hitch ball. A tensioner is connected to the cable to add or adjust the level of tension in the cable. When the cable is tensioned, a rotational force is generated about the hitch ball between the trailer and towing vehicle that distributes tongue weight away from the hitch ball and socket connection.

20 Claims, 15 Drawing Sheets

(56) References Cited

U.S. PATENT DOCUMENTS

| | | | |
|---|---|---|---|
| 11,623,484 B2* | 4/2023 | Hall | ............... B60D 1/247 |
| | | | 280/402 |
| 11,642,923 B2 | 5/2023 | Bodily | |
| 11,820,180 B2 | 11/2023 | Hall et al. | |
| 2015/0108736 A1* | 4/2015 | Jamieson | ............ B60D 1/38 |
| | | | 280/477 |

* cited by examiner

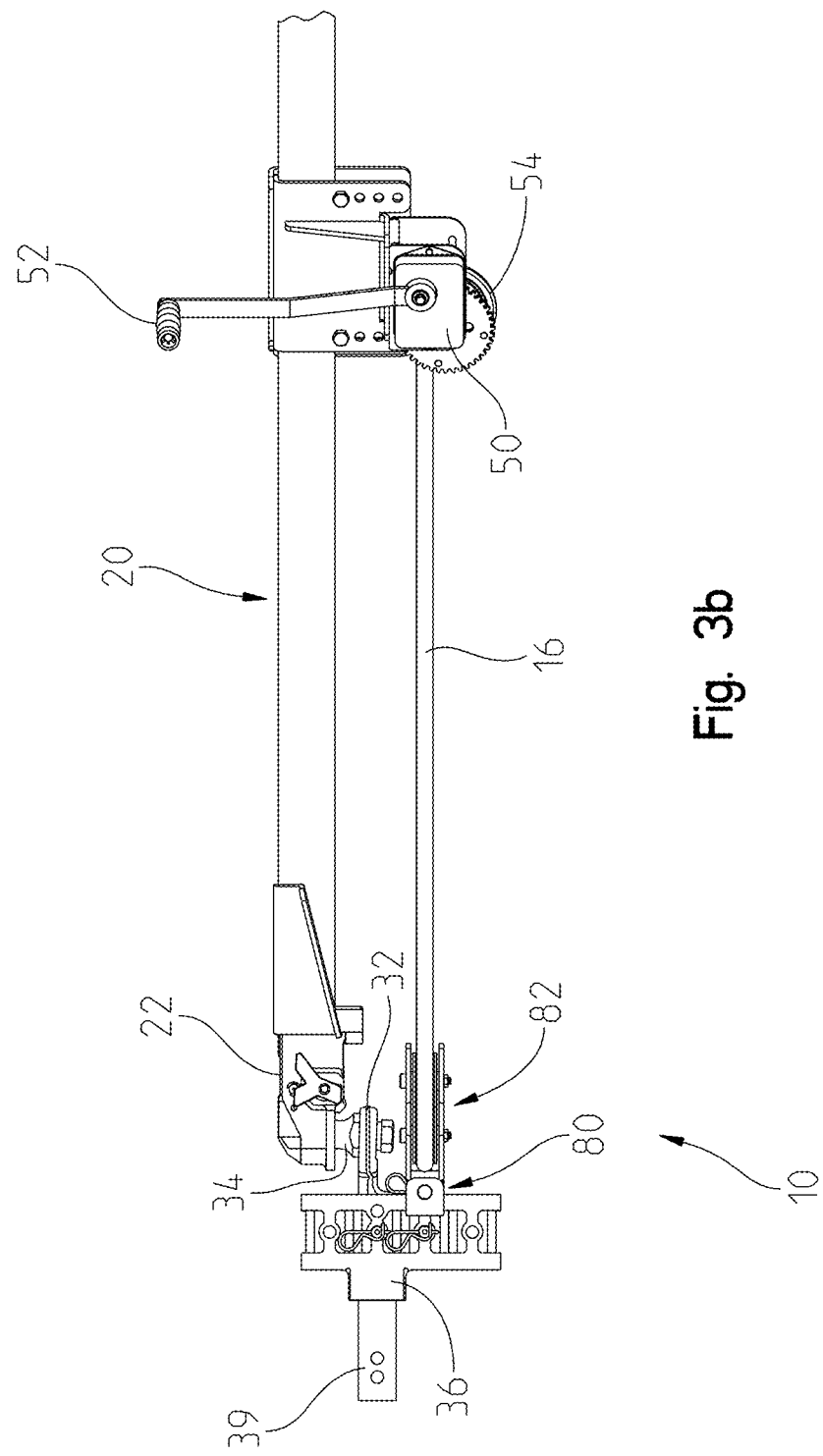

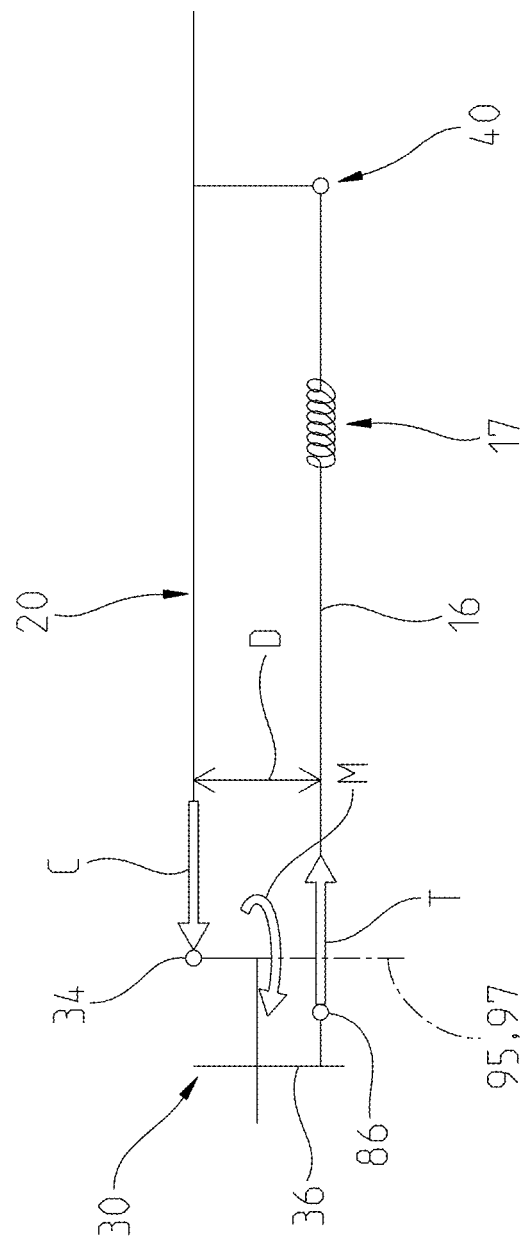

WEIGHT DISTRIBUTION HITCH

BACKGROUND OF THE INVENTION

The present disclosure relates to towing and weight distribution. When towing a heavy trailer, weight distribution is critical for ride comfort and safety. It is well-known that insufficient tongue weight results in an unstable towing setup, subject to uncontrollable sway that can result in the trailer and/or vehicle flipping over. Too much tongue weight can result in excessive load on the towing vehicle and its suspension. With excessive tongue weight, the rear of the vehicle "squats," which raises up the front. This can cause oncoming traffic to be blinded and unstable driving with insufficient weight on the front. Others have created devices such as what is shown in U.S. Pat. Nos. 5,984,341, 5,375,867, and 8,186,702 that transfer tongue weight from the trailer to the towing vehicle, but all of these devices suffer from the same issue. They are heavy, difficult to install, set up, and remove. Further, they require that the user manually level out the trailer using the tongue jack before fully connecting the weight distribution mechanism, which includes fully unloading the mechanism using the tongue jack or other means to make any adjustments. Lastly, these devices limit the user's ability to make tight turns and back the trailer. Therefore, an improved device is needed.

SUMMARY OF THE INVENTION

The present disclosure describes a weight distribution hitch for attachment to a towing vehicle and a trailer coupled to the towing vehicle with a ball-and-socket connection. The trailer is generally pivotable with respect to the vehicle about the ball-and-socket connection in a yaw, pitch, and/or roll direction. The weight distribution hitch has a vehicle attachment portion that comprises a shank that is affixable to the towing vehicle and the shank has a hitch ball affixed thereto. The vehicle attachment portion includes a pulley portion pivotable about a pivot axis and the pivot axis is fixed with respect to the shank and spaced from the hitch ball. The hitch includes a cable extending through the pulley portion, with the cable having a first end and a second end. The cable is slidable through the pulley portion between the first and second ends. The hitch includes a trailer frame attachment portion for fixing the first and second ends of the cable with respect to the trailer. An adjustable tensioner is attached to the cable for adjusting tension in the cable.

When the trailer is coupled to the hitch ball and the trailer frame attachment is attached to said trailer with the cable extending between the vehicle attachment portion and trailer, tension in the cable imparts a rotational force between the vehicle and trailer in the pitch direction. Further, when the trailer pivots with respect to the vehicle in the yaw direction, the cable slides through the pulley portion.

BRIEF DESCRIPTION OF THE DRAWINGS

FIG. 3b is a left side view of the weight distribution hitch shown in FIG. 2;

FIG. 4b is a schematic representation of the weight distribution hitch shown in FIG. 3b illustrating forces;

DESCRIPTION OF THE PREFERRED EMBODIMENT

Figure 1:
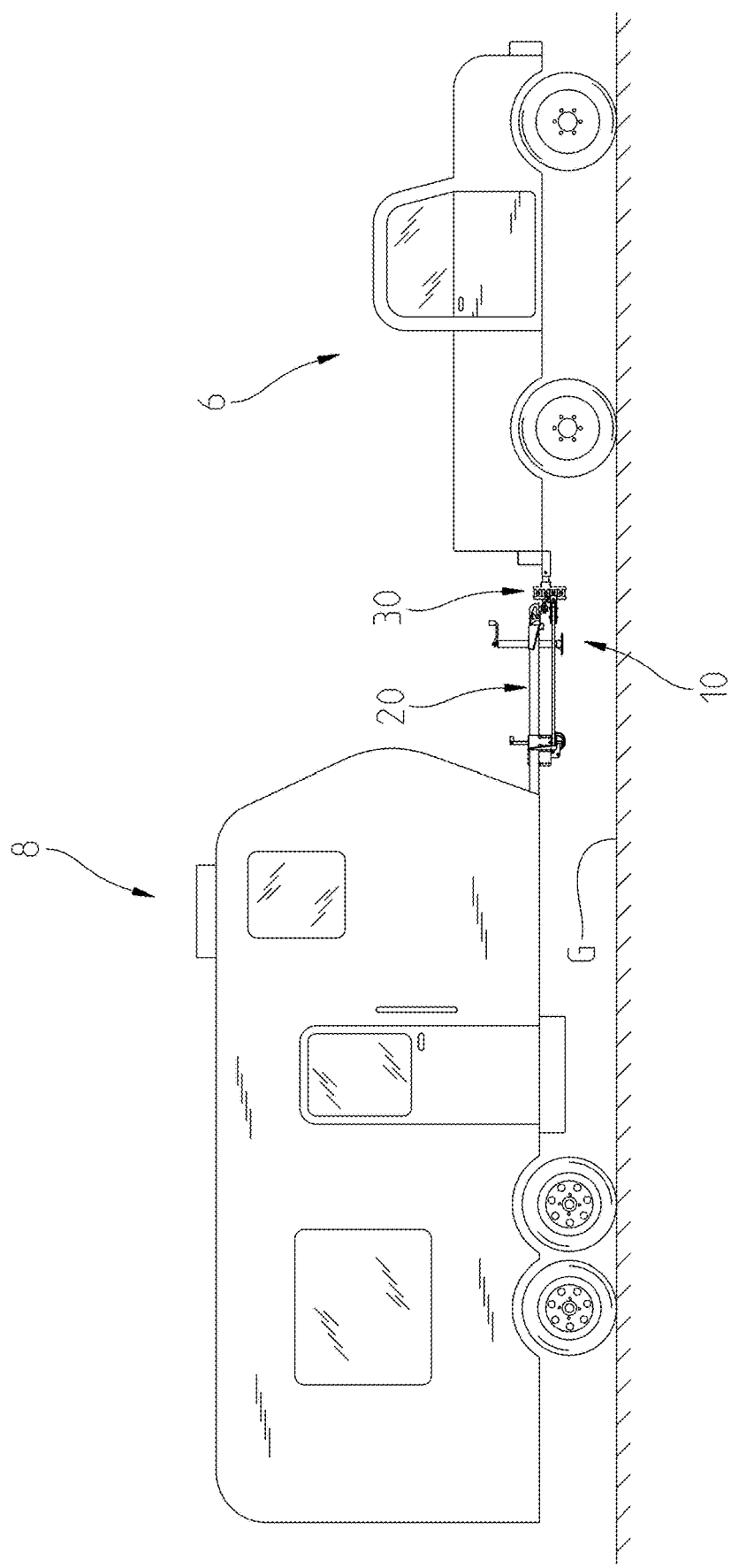
FIG. 1 is a right side view of a weight distribution hitch as attached to a towing vehicle and trailer.
Figure 2:
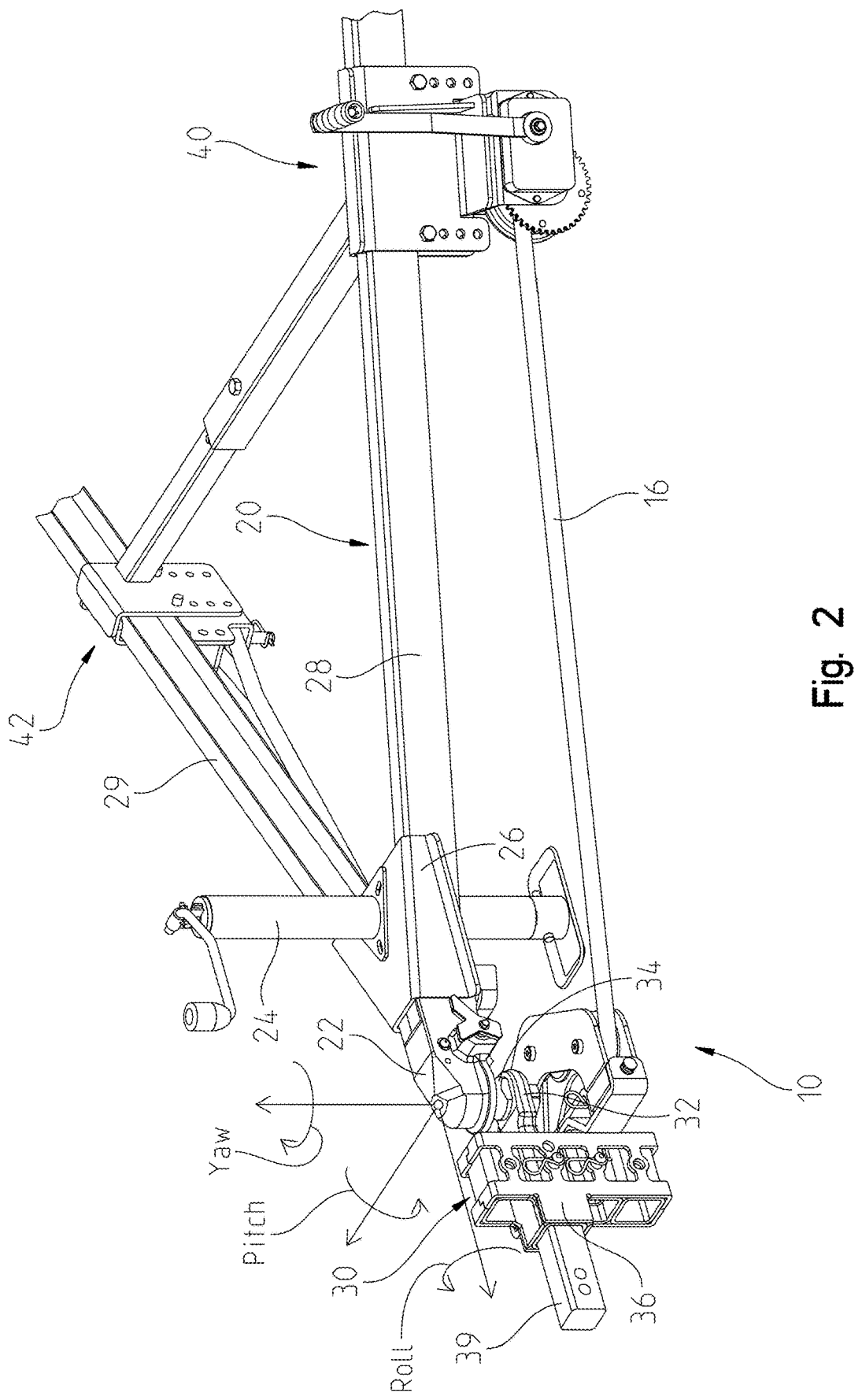
FIG. 2 is an isometric view of the weight distribution hitch shown in FIG. 1.

A cable-based weight distribution hitch 10 is shown in FIG. 1 as attached between a towing vehicle 6 and trailer 8. The trailer 8 is coupled to the rear of the vehicle 6, commonly called a "bumper pull" arrangement where the tongue of the trailer is coupled to the vehicle aft (rearward) of the vehicle's rear axle. The connection is through a hitch ball 34 that is coupled to a coupler 22 that allows the trailer 8 to pivot with respect to the vehicle 6. In the embodiment shown herein, the weight distribution hitch 10 is added to the existing bumper pull configuration where it is attached to a trailer frame 20 and a towing receiver 30. FIG. 2 shows the hitch 10 without the towing vehicle and only the front portion of the trailer frame 20. The front portion of the trailer frame 20 includes a coupler 22, tongue jack 24 attached to a jack plate 26, and frame rails 28, 29. The towing receiver 30 includes a ball mount 32 with a hitch ball 34. The ball mount 32 is attached to a stacked receiver 36 that has vertically-arranged receivers 38 and a vehicle shank 39. The vehicle shank 39 is attached to the towing vehicle.

Figure 7:
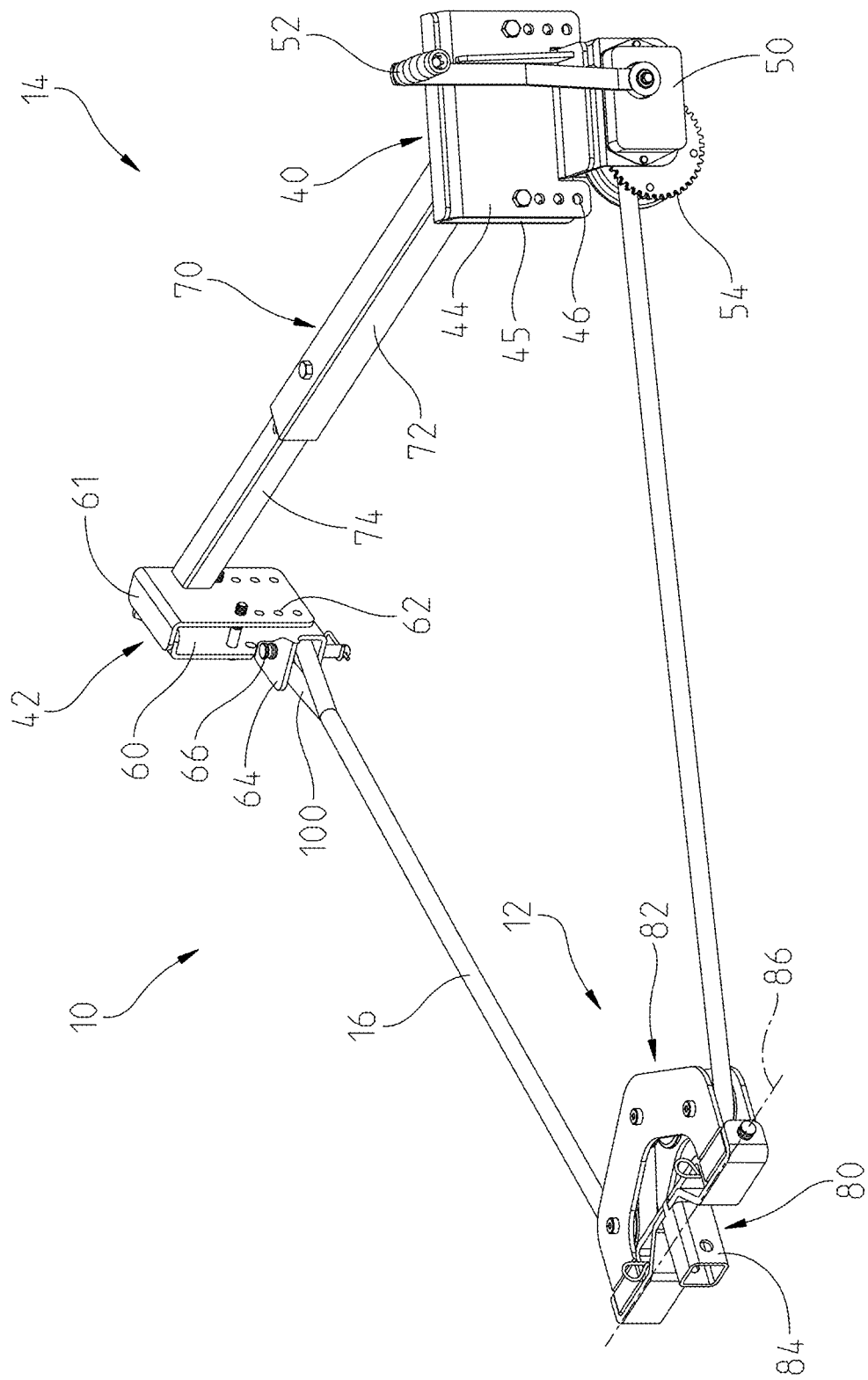
FIG. 7 is an isometric view of the weight distribution hitch shown in FIG. 2 without the trailer frame, coupler, or stacked receiver.

FIG. 7 shows portions of the hitch 10 separate from the trailer and receiver, with a pulley portion 12, a mount portion 14, and a kinetic cable 16 connected therebetween. The mount portion 14 is secured to the trailer frame 20 and has a crank end 40 and a loop end 42. The crank end 40 has a frame clamp 44, 45 formed from overlapping bent sheet metal and having a plurality of mounting apertures 46. The mounting apertures 46 receive fasteners to secure the crank end 40 to the frame rail 28 through clamping. The crank end 40 includes a gear-driven hand crank tensioner 50. The tensioner 50 has a handle 52 that drives a take-up drum 54 through a gear reduction. The loop end 42 has a similar frame clamp 60, 61 with mounting apertures 62 that receive fasteners. The loop end 42 includes a loop bracket 64 with a removable pin 66. As shown, the crank end 40 and loop end 42 have an interconnecting frame 70 with a first portion 72 affixed to the crank end 40 and a second portion 74 affixed to the loop end 42. The first and second portions 72, 74 are affixed together with a fastener or fasteners. It is contemplated that the crank end 40 and loop end 42 are separate without an interconnecting frame 70. The frame clamps 44, 45 and 60, 61 allow for clamping to different thicknesses and heights of the frame rails 28, 29. It is further contemplated that the loop end 42 and crank end 40 are integrated into or directly affixed to the frame rails 28, 29.

Figure 6:
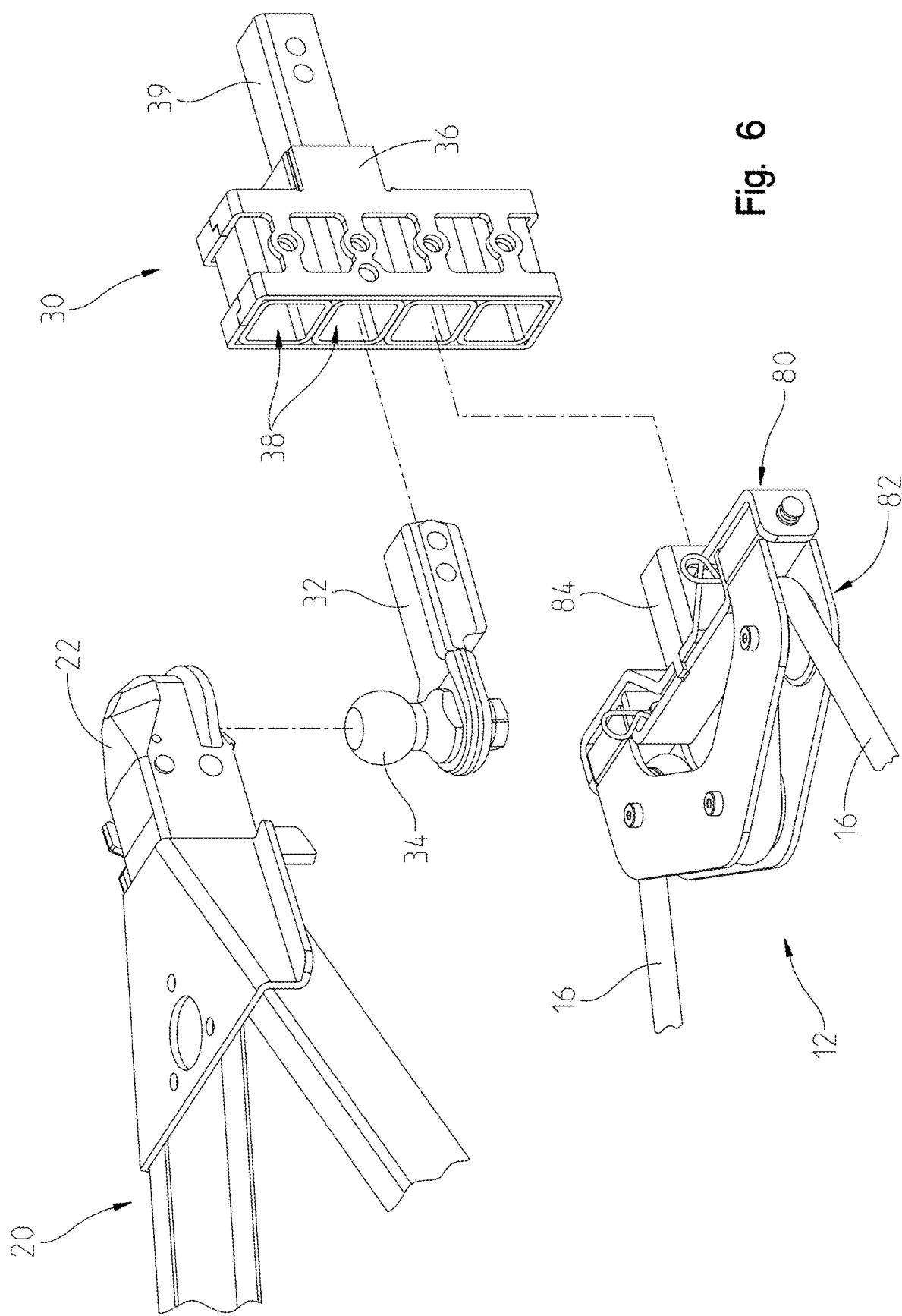
FIG. 6 is a partial exploded isometric view of the weight distribution hitch in FIG. 2.
Figure 8:
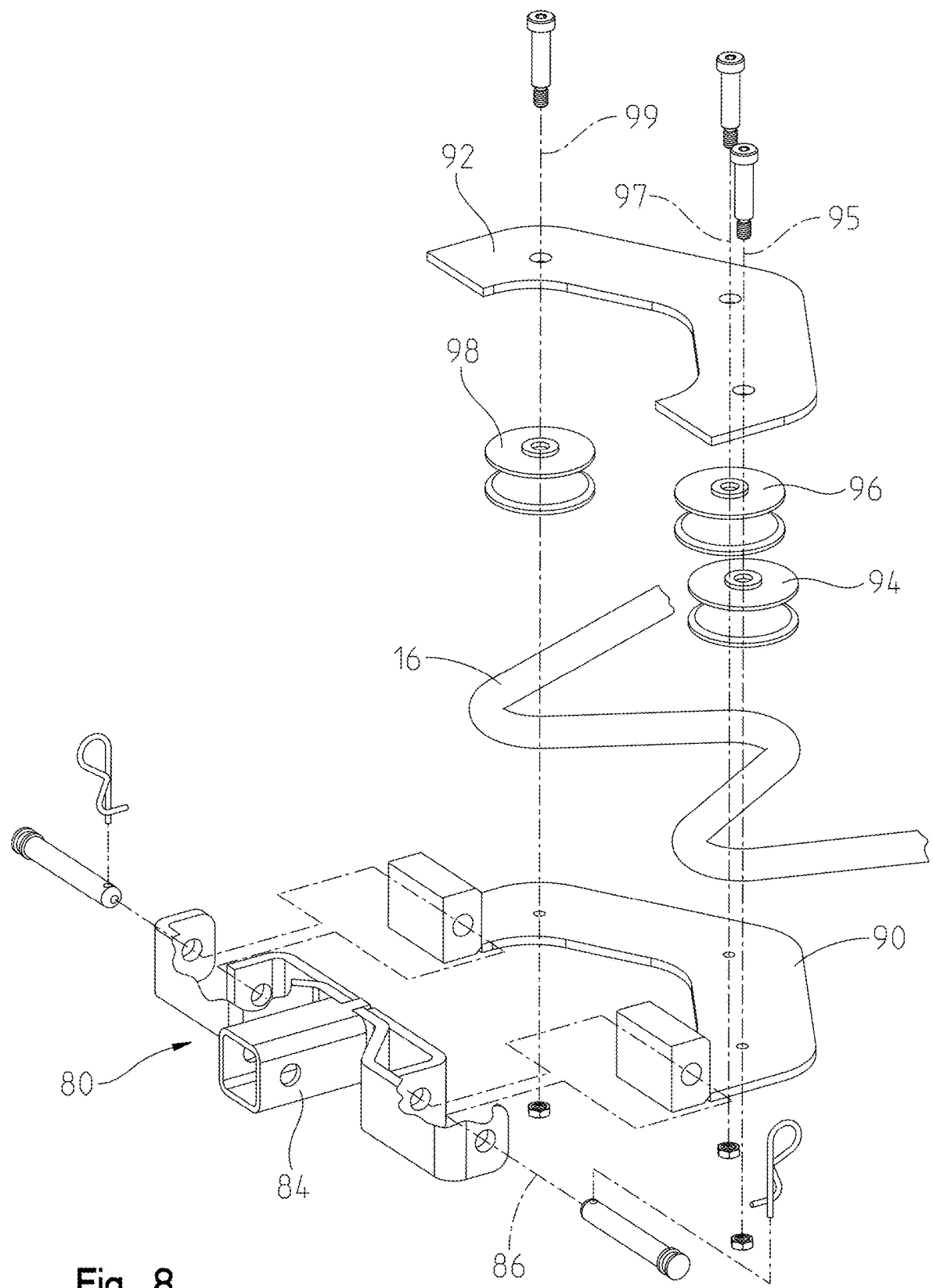
FIG. 8 is a partially exploded isometric view of the pulley portion shown in FIG. 6.

The pulley portion 12 is shown in FIG. 6 and partially exploded in FIG. 8. The pulley portion 12 has a fixed attachment portion 80 and a pivoting portion 82 that pivots about a pivot axis 86. In FIG. 8, the fixed attachment portion 80 is shown separate from the pivoting portion 82. The fixed attachment portion 80 has a shank 84 for being secured in one of the vertically-arranged receivers 38, along with structural components formed from sheet metal that allow the pivoting portion 82 to connect and pivot. The pivot axis 86 extends through the shank 84 as shown in FIGS. 7 and 8. The pivoting portion 82 has a bottom plate 90, a top plate 92, and sheaves 94, 96, 98 sandwiched therebetween. Allowing the pivoting portion 82 to pivot about the pivot axis 86 ensures that the kinetic cable 16 aligns with the grooves in the sheaves to prevent premature wear. The sheaves 94, 96, 98 are rotatable on their own rotational axis 95, 97, 99 to allow the kinetic cable 16 to move through. As can be seen in the side view FIG. 3b, the rotational axes 95, 99 are aligned with the hitch ball 34 in the embodiment shown herein. Rotational axis 97 of the center sheave 96 is offset rearward of the hitch ball 34. One or all of the sheaves 94, 96, 98 may contain a friction element to resist rotation of the sheave about its rotational axis. The friction element can be a separate component connected between the sheave and top and/or bottom plates or the shaft it rotates about. Alternatively, the sheave or sheaves may be compressed between the top and bottom plates 90, 92 to add rotational resistance. It is contemplated that the pulley portion 12 does not have a pivot between the sheaves 94, 96, 98 and shank 84. It is further contemplated that the hitch ball 34 and pulley portion 12 are integrated into the same assembly.

Figure 3A:
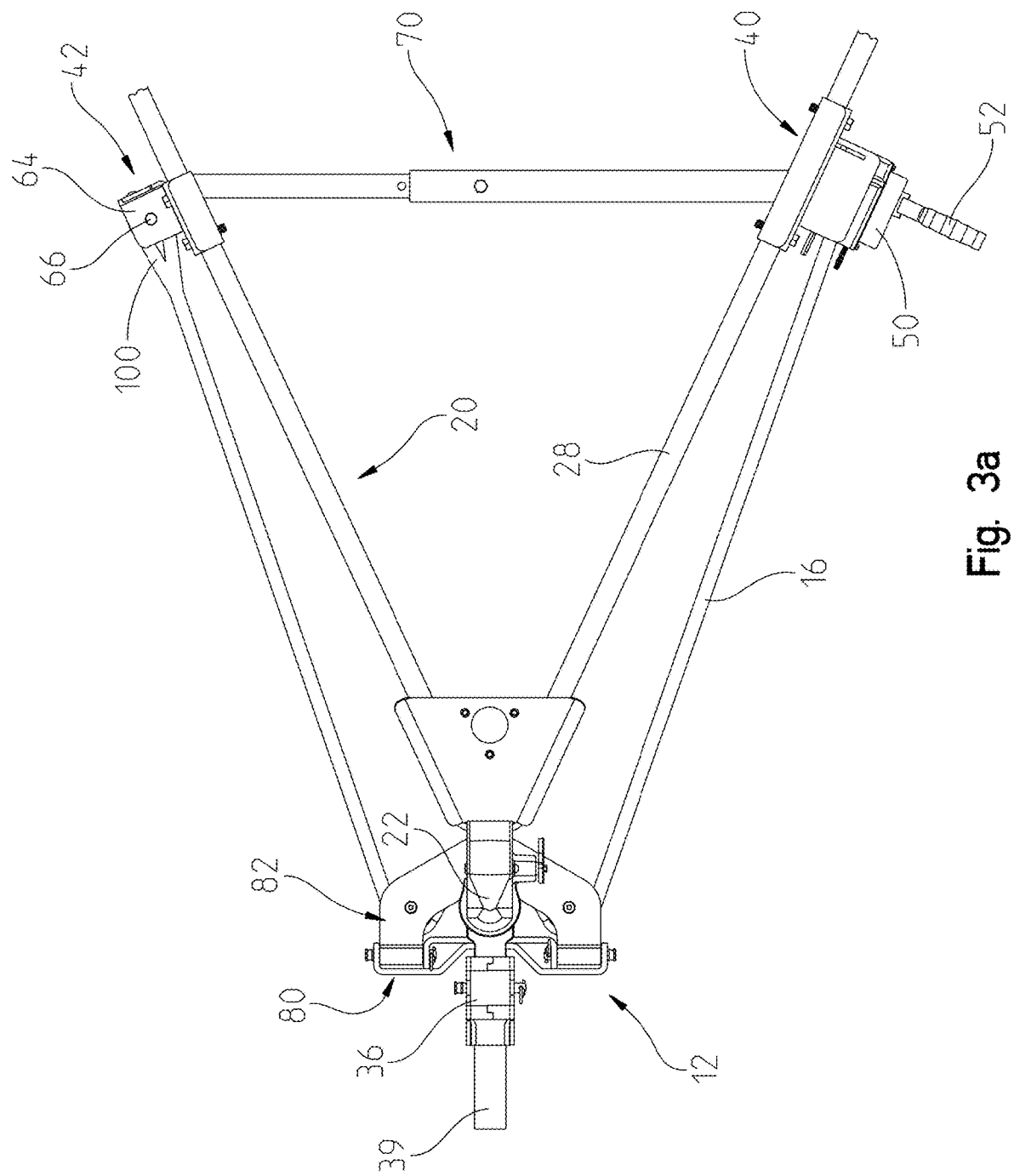
FIG. 3a is a top view of the weight distribution hitch shown in FIG. 2.
Figure 4A:
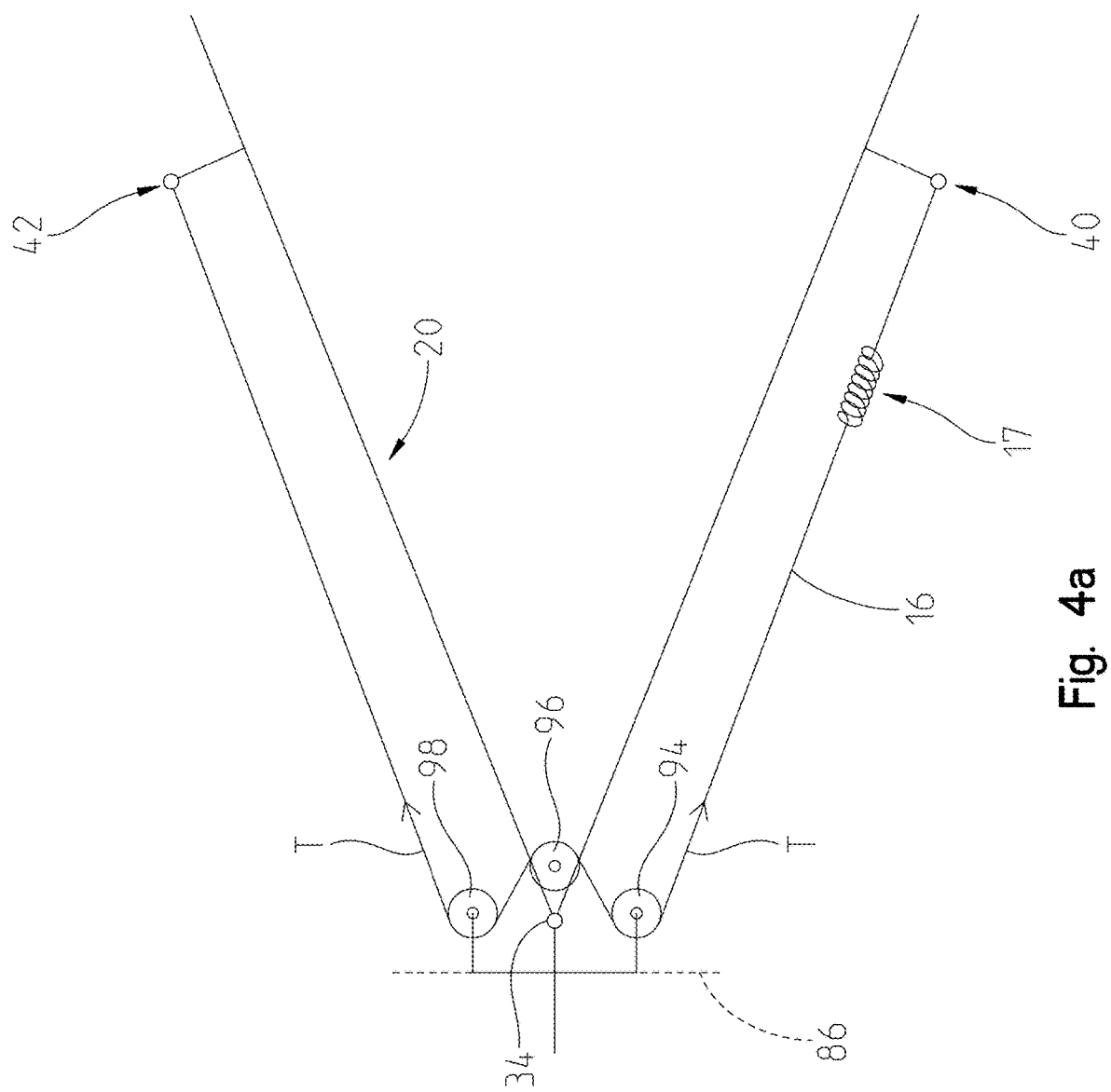
FIG. 4a is a schematic representation of the weight distribution hitch shown in FIG. 3a illustrating forces.
Figure 11:
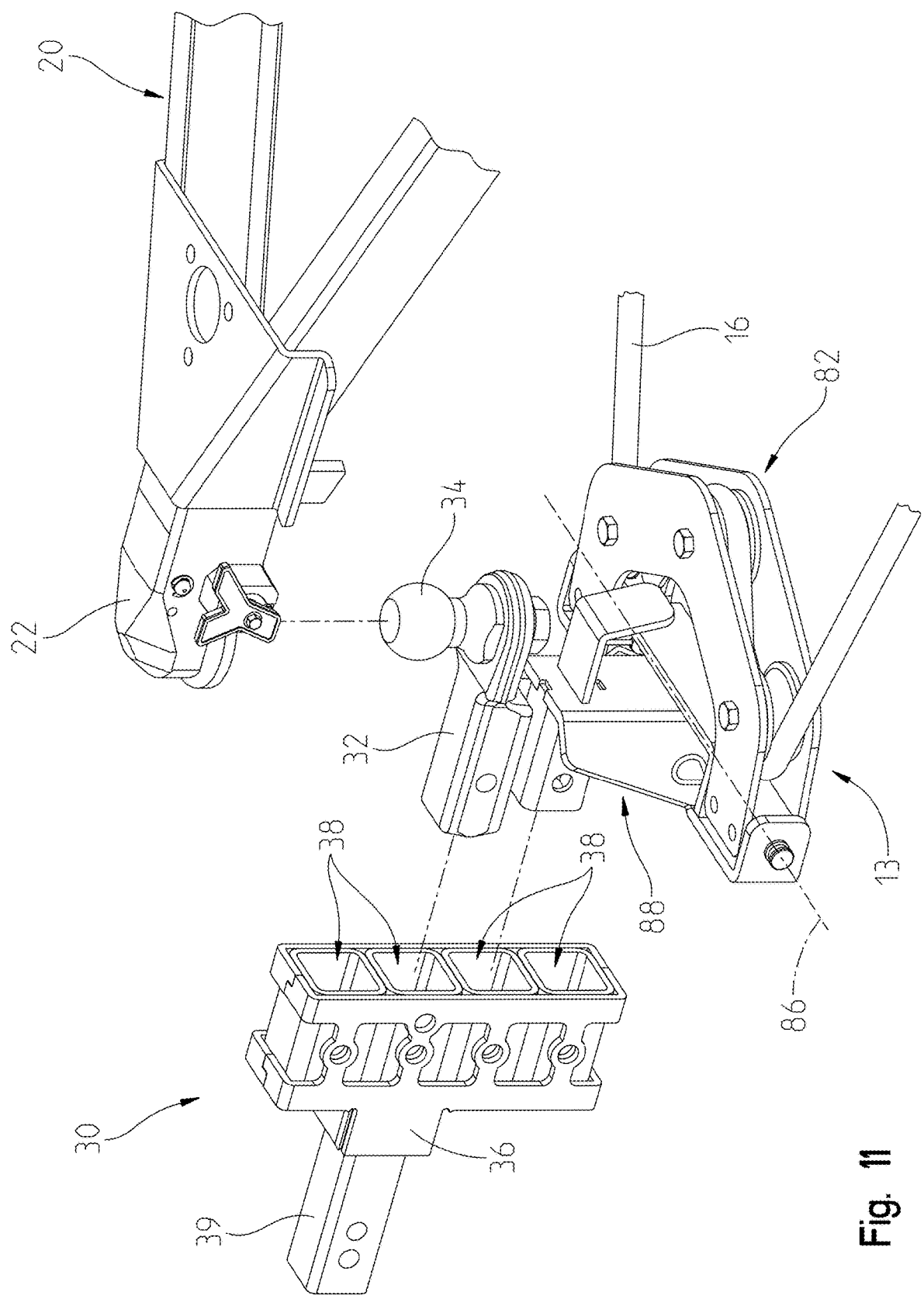
FIG. 11 is an exploded isometric patrial view 11 of the alternate embodiment shown in FIG. 10.

The kinetic cable 16 has a loop 100 on one end with the opposite free end 101 being secured to the take-up drum 54. If a different take-up drum is used, such as the releasing take-up drum 154 shown in FIGS. 11-12, the free end 101 can be loose or releasably engaged with the take-up drum 154. The loop 100 is retained on the loop end 42 with the removable pin 66 as shown in FIG. 3a. Between the two ends, the kinetic cable 16 passes through the pulley portion 12, wrapping around the outer sheaves 94, 98 and the center sheave 96. The kinetic cable 16 contains inherent resiliency in the embodiment herein, able to stretch up to 30% of its length to store energy. The resiliency of the kinetic cable 16 is represented in FIGS. 4a and 4b as a discrete spring 17. Instead of a kinetic cable 16, it is contemplated that a standard cable or strap is used in combination with a spring element. The spring element could be a discrete spring located in line with the cable, at one of the attachment points, the mount portion 14, or even integrated into the pulley portion 12. It is contemplated that one or more of the sheaves is spring-loaded and slidable to allow resiliency between the attachment points of the kinetic cable 16. Further, the pulley portion 12 may not contain any sheaves, instead only having a channel, groove, or path for the kinetic cable 16 to pass through.

Figure 9:
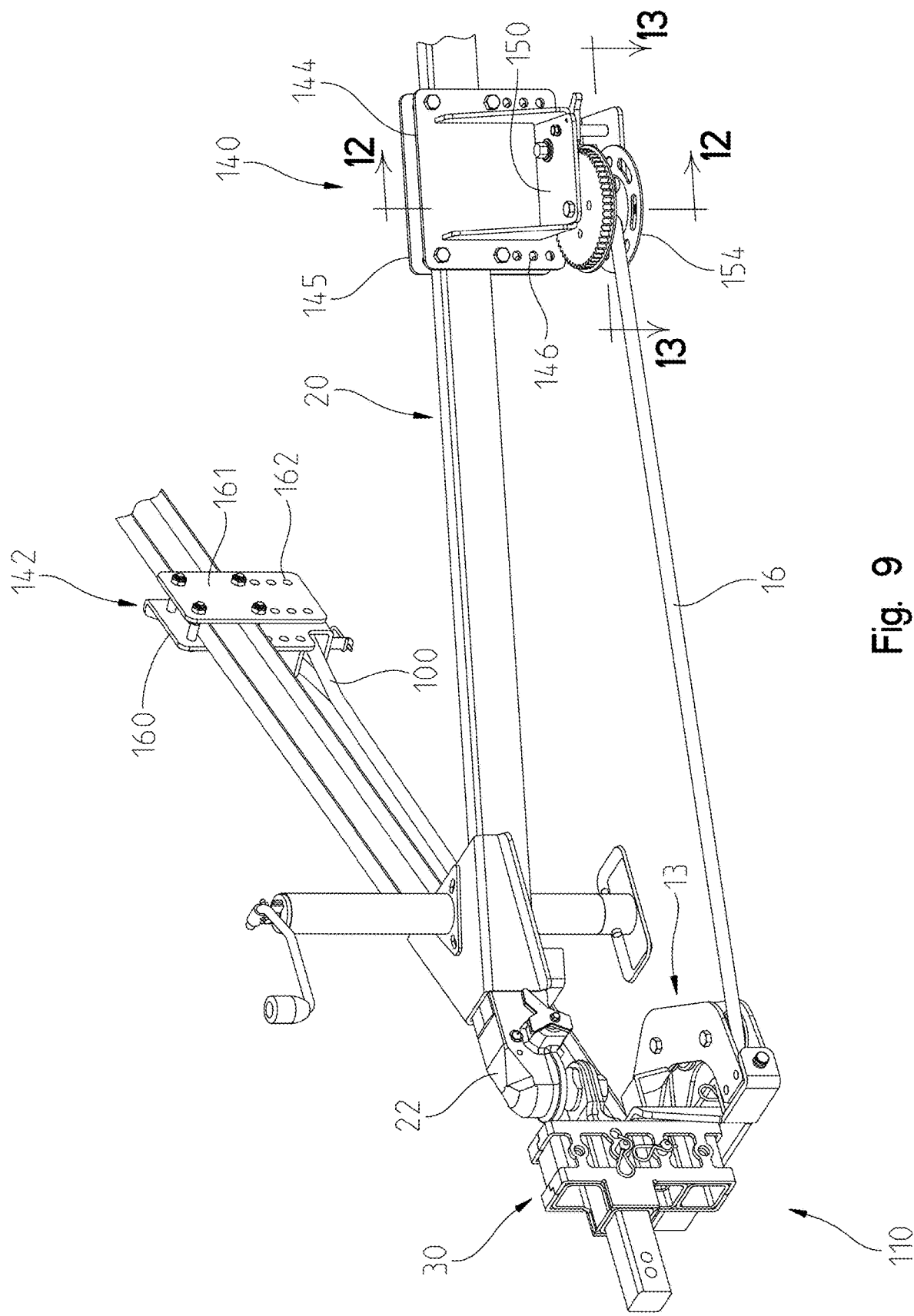
FIG. 9 is an isometric view of an alternate embodiment of the weight distribution hitch.
Figure 10:
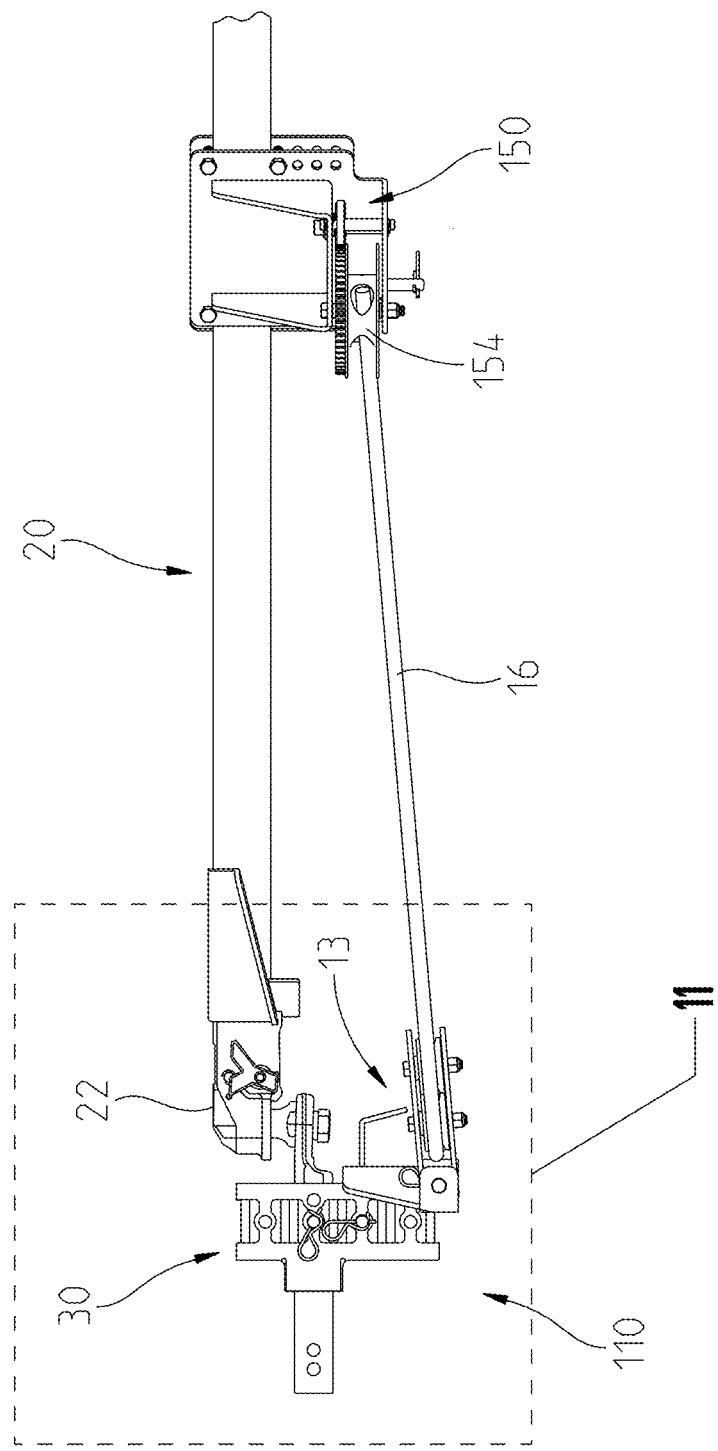
FIG. 10 is a left side view of the weight distribution hitch in FIG. 9.

Turning now to the schematic of forces and simplified mechanism shown in FIGS. 4a and 4b, the cable 16 is in tension in operation. The cable 16 is routed around the sheaves in the pivoting portion 82 that can pivot about the pivot axis 86. The tension T in the cable 16 on each side of the pulley portion 12 becomes a force vector that intersects the pivot axis 86. This force vector is transmitted through to the fixed attachment portion 80 and ultimately the stacked receiver 36. Because of the tension force, the trailer frame 20 has a reaction force in compression C that is transmitted through to the hitch ball 34 and ultimately the stacked receiver 36. The distance D between the tension forces T and compression forces C creates torsion/moment forces M in the stacked receiver 36 and shank 39. Because the shank 39 is attached to the towing vehicle 6, the torsion forces effectively transfer some of the tongue weight to a point forward of the coupler 22. This moment force M raises up the ball and socket connection from the ground G. The torsion forces are generated only through tension T in the cable 16 and its spacing from the coupler/ball-and-socket connection. With an increased distance between the force vector and coupler, such as the embodiment shown in FIGS. 9-10, tension in the cable 16 creates an increased moment force on the stacked receiver 36.

Figure 5:
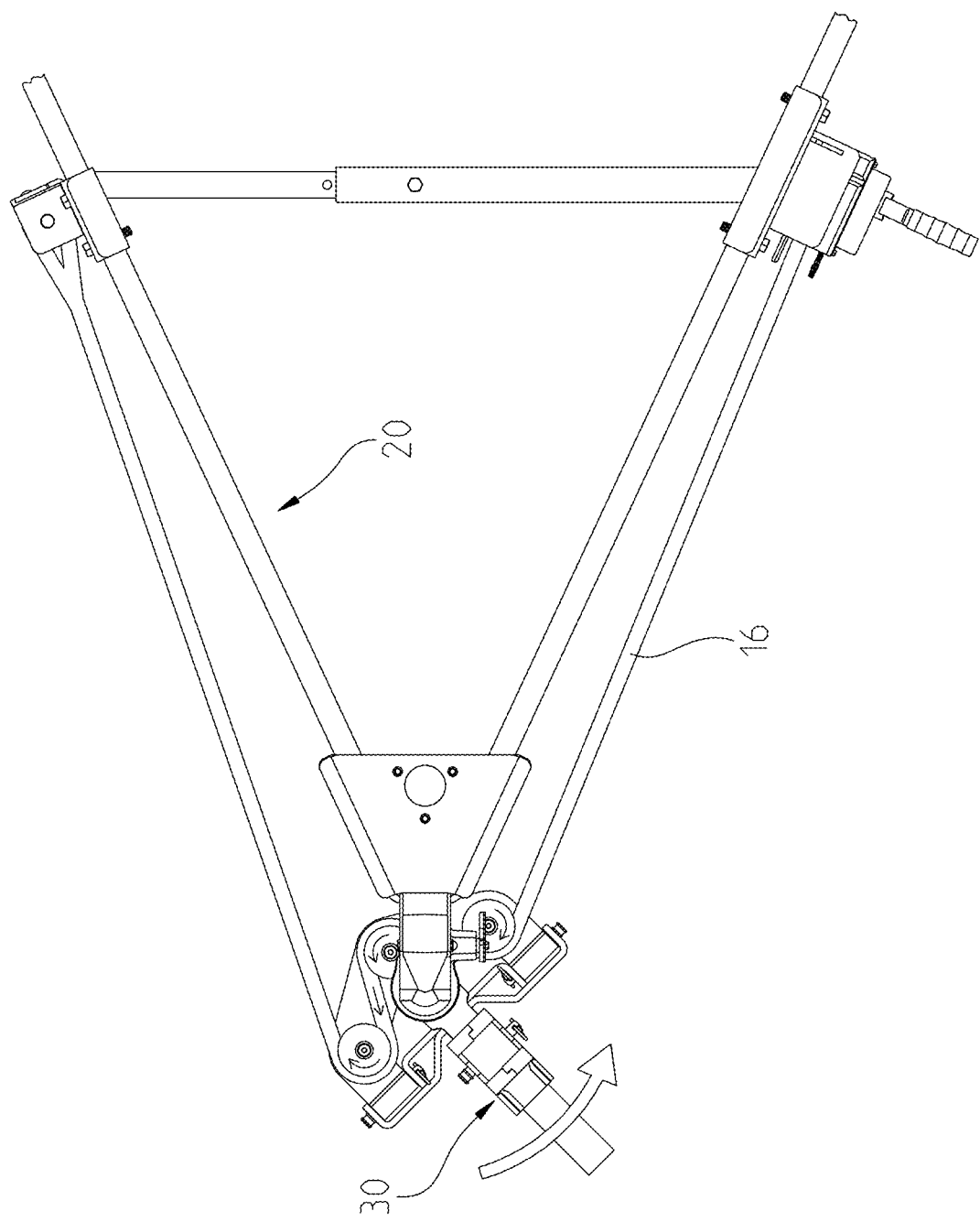
FIG. 5 is a top view of the weight distribution hitch shown in FIG. 3a with the trailer pivoted with respect to the vehicle in the yaw direction.

The operation of the weight distribution hitch 10 is as follows: To provide weight distribution, the kinetic cable 16 operates under tension which creates tension forces between the trailer 8 and towing vehicle 6 that are located below the hitch ball 34 and coupler 22 connection. The amount and location of these forces transfer some of the trailer's tongue weight away from the hitch ball 34 by generating a moment force M about the hitch ball 34 and coupler 22. Movement of the trailer (with respect to the vehicle or stacked receiver) is possible in multiple directions due to the ball and socket connection. For clarity and identification purposes only, movement of the trailer with respect to the vehicle is described as follows: yaw, pitch, and roll, identified in FIG. 2. One of these directions is in the "yaw" direction, such as when the vehicle makes a turn. This is shown in FIG. 5. As viewed from above, the vehicle is at a different angle than the trailer. Another direction is in the "roll" direction, such as when the trailer is at a different elevation on one side compared to the other side in relation to the towing vehicle. As viewed from the front or back, the vehicle is at a different angle than the trailer. This occurs if one of the trailer tires drops into a pothole or goes over a curb. Lastly, the trailer can move in the "pitch" direction, such as when the vehicle and trailer travel over a crown or dip in the road. As viewed from the side, the vehicle is at a different angle than the trailer. Movement in the pitch direction has the largest impact on the tension in the kinetic cable 16. While these directional movements (yaw, pitch, roll) are described independently, these movements frequently occur in multiple directions simultaneously in use.

When the user turns (yaw direction), the kinetic cable 16 passes through the sheaves 94, 96, and 98. The location and spacing of the sheaves maintains a consistent distance between the ends of the kinetic cable 16 when the vehicle and trailer are at different yaw angles, such as when the vehicle makes a turn. Specifically, the distance along the length and between the endpoints of the kinetic cable 16 is substantially constant as the vehicle pivots with respect to the trailer. If this distance did not remain substantially constant, turning a corner (yaw) would result in either increased or decreased tension in the kinetic cable 16, resulting in increased or decreased weight distribution.

When the user travels over bumps or irregular pavement that cause the towing vehicle 6 and trailer 8 to move to different pitch angles, the pivoting portion 82 pivots with respect to the fixed attachment portion 80. In addition, trailer sway control occurs through the friction or resistance to the cable 16 passing through the pulley portion 12. Resistance to the cable movement through the pulley portion 12 can be accomplished by adding resistance to rotation on one or more of the sheaves 94, 96, 98. The amount of sway control is also impacted by the distance between the outer sheaves 94, 98, with closer together spacing creating less sway control and greater distance increasing the amount of sway control.

An alternate embodiment of the weight distribution hitch 110 is shown in FIGS. 9-13. The hitch 110 uses many of the same components as the hitch 10 but increases the weight distribution forces by further offsetting the pulley portion 13 away from the hitch ball 34 and coupler 22 connection. The crank end 140 and loop end 142 are slightly different from the crank end 40 and loop end 42. The loop end 142 has flat frame clamps 160, 161 with apertures 162 for fasteners. Crank end 140 also has flat frame clamps 144, 145 with apertures 146 for fasteners. In addition, this embodiment of the crank and loop end 140, 142 omits the interconnecting frame. The alternate embodiment also includes a tensioner 150 with a releasing take-up drum 154. The pulley portion 13 uses the same pivoting portion 82 but incorporates an attachment portion 88 that offsets the pivot axis 86. Extrapolating this design to the schematic representations shown in FIGS. 4a and 4b, this increased distance between the hitch ball 34 and pivot axis 86 increases the distance D. Increasing the distance D (even with the same tension force in the cable 16) increases the moment force M, and therefore the weight distribution, of the hitch 110.

Figure 12:
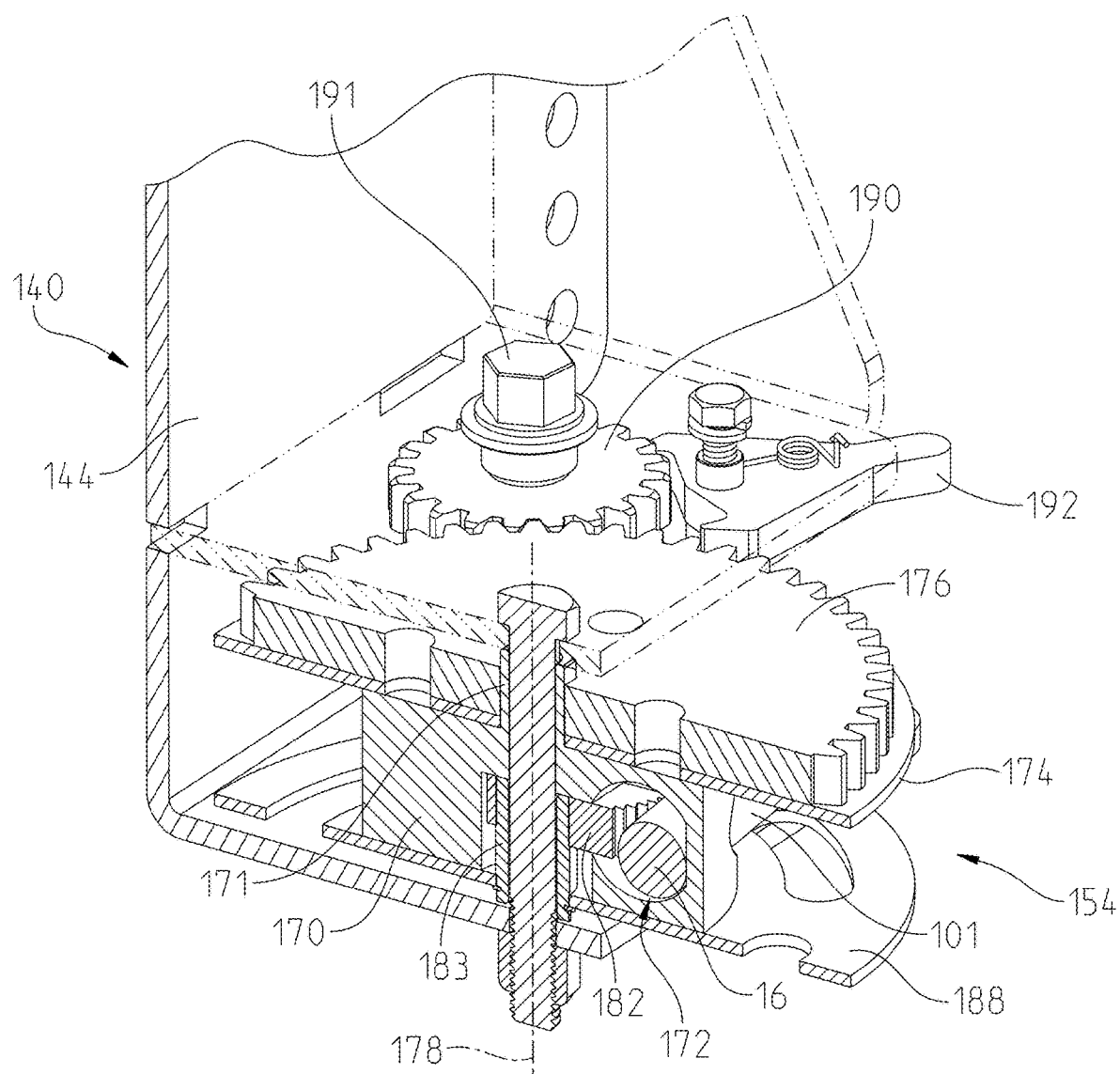
FIG. 12 is a partial side section view 12-12 of the tensioner shown in FIG. 9.
Figure 13:
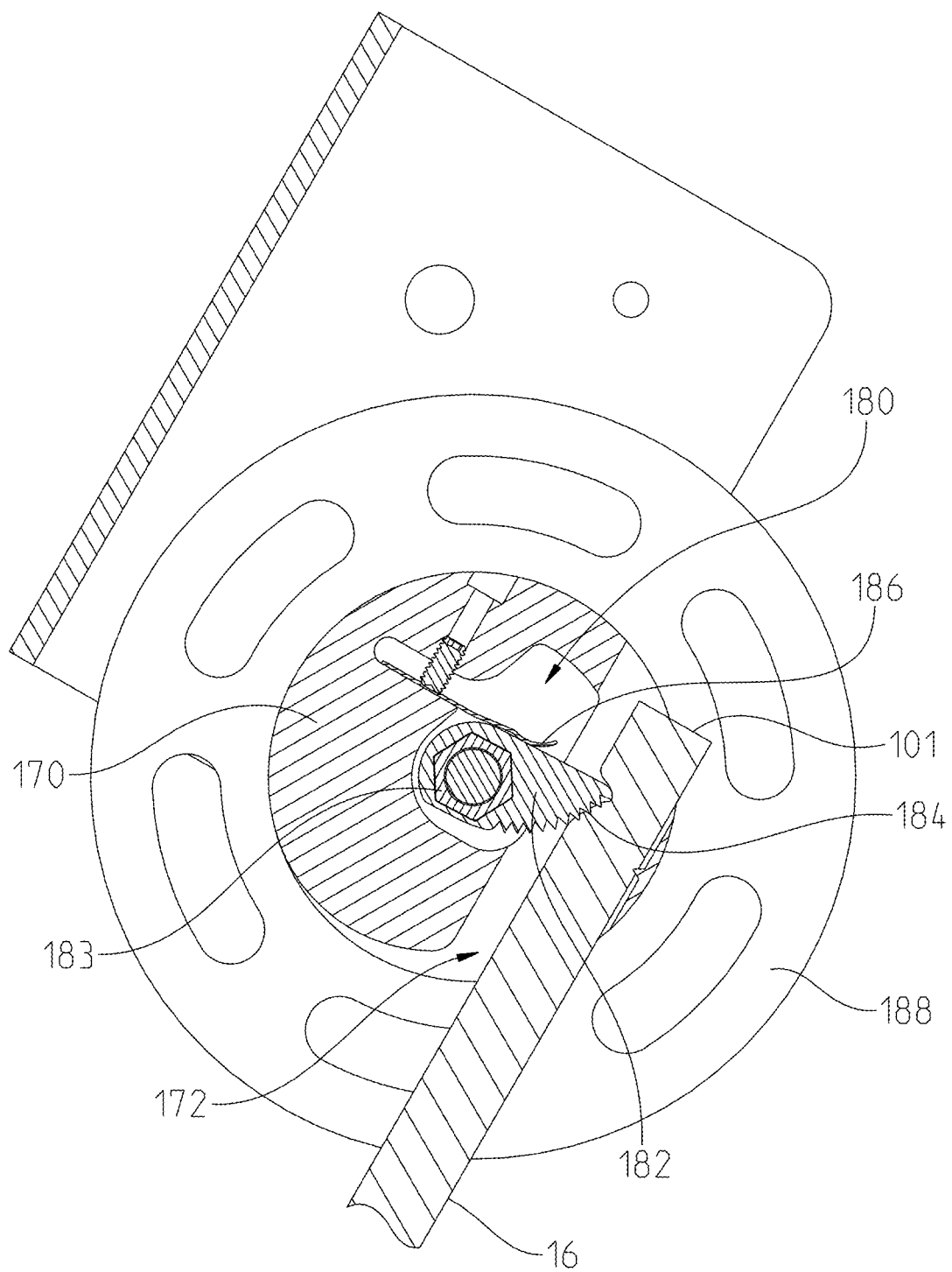
FIG. 13 is a partial top section view 13-13 of the tensioner shown in FIG. 9.

Turning now to the details of the tensioner 150, the releasing take-up drum 154 is an assembly of multiple components that form a mechanism with portions that are movable relative to each other to clamp or release the cable 16. As shown in FIG. 12, the releasing take-up drum 154 has a hub 170 with a chordal aperture 172 large enough to receive the cable 16. The hub 170 is secured to a fixed plate 174 and gear 176, with these parts all rotating together about a drum axis 178. These parts are fixed from rotation with respect to each other by the hexagonal portion 171 of the hub that extends through the fixed plate 174 and gear 176 shown in FIG. 12. The hub 170 also includes a cam cavity 180 that extends into the chordal aperture 172, shown in FIG. 13. Located in the cam cavity 180 is a cam clamp 182 that is rotatable between a clamped position and a released position. In the clamped position, the cam clamp 182 extends into the chordal aperture 172. In the released position, the cam clamp 182 is retracted sufficiently for the cable 16 to slide through the chordal aperture 172. The cam clamp 182 has a series of gripping teeth 184 that grip the cable 16 when it is rotated towards the clamped position. The cam clamp 182 is biased towards the clamped position with a spring 186 and is shaped to allow the cable 16 to move through the chordal aperture 172 in one direction but clamps against the cable 16 when the cable is moved in the opposite direction. The cam clamp 182 is also attached to a moveable plate 188 through a cam clamp hub 183 so that rotation of the moveable plate 188 also rotates the cam clamp 182. For clarity, the hub 170 has a fixed portion and a moveable portion. The fixed portion comprises the fixed plate 174 (along with the hub 170 and gear 176) that are rotatable about the drum axis 178. The moveable portion comprises the moveable plate 188 (along with the cam clamp 182 and hub 183) that are rotatable about the drum axis 178 but are also rotatable with respect to the fixed portion. It is contemplated that the cam clamp 182 is attached to another component that allows it to be moved between the released and clamped position. It is further contemplated that the cam clamp 182 is attached to the gear 176 with other components being moveable to move the cam clamp 182 with respect to the chordal aperture 172. If the user desires to retract the cam clamp 182 to release the cable 16, the user rotates the moveable plate 188 with respect to the fixed plate and gear 174, 176, thereby rotating the cam clamp 182 towards the released position and clear of the cable 16.

The gear 176 is mated to a driving gear 190 that engages with a reversing lever 192. The reversing lever 192 is moveable between a clockwise position and a counterclockwise position. The positions of the reversing lever 192 allow the driving gear 190 to move only in the clockwise or counterclockwise position. The driving gear 190 has a hexagonal shaft 191 that allows the user to attach a removable handle to rotate the driving gear 190 and take-up drum 154 to add or remove tension from the cable 16.

It is contemplated that the attachment points of the kinetic cable are reversed between the vehicle and trailer. In this reverse embodiment (not shown), the kinetic cable passes through the portions attached to the trailer and the ends of the kinetic cable are fixed with respect to the shank 84 or vehicle shank 39. This embodiment could also include sheaves attached to the trailer for the kinetic cable to pass through. A tensioning device such as tensioner 50 could be attached to the vehicle portion or in line with the kinetic cable.

The installation and removal of the weight distribution hitch 10 generally follows these steps: The user couples the trailer to the towing vehicle and installs the pulley portion 12 in a receiver 38 underneath the ball mount 32. The user then attaches the mount portion 14 to the trailer and tightens the fasteners that secure the frame clamps 44, 60. If not already connected, the user winds out the tensioner 50 to provide sufficient slack in the kinetic cable 16 to attach the loop 100 to the loop end 42 with the removable pin 66. If the tensioner 150 with releasing take-up drum 154 is used, the loop 100 can remain attached and the free end 101 is mated to the take-up drum 154 by inserting it into the chordal aperture 172 to engage the cable 16 with the cam clamp 182. Tightening of the tensioner 150 causes the cam clamp 182 to more tightly clamp the cable 16. With the hitch ball 34 carrying the tongue weight of the trailer, the user then winds up the tensioner 50, 150 to take up any slack and provide tension in the kinetic cable 16. The user continues to wind up the tensioner 50 until the desired amount of weight distribution is achieved. To remove the weight distribution hitch 10, the user winds out the tensioner 50, 150 until the tension is removed from the kinetic cable 16 and reverses the steps used for installation. If the user desires to uncouple the towing vehicle from the trailer, the user winds out the tensioner 50, 150 and the tongue jack 24 is lowered until the tongue weight is removed from the hitch ball 34 and tension is removed from the kinetic cable 16. The user pulls the hitch pin that holds the pulley portion 12 and uncouples the coupler 22, along with removal of any safety chains, trailer wiring, or safety brake cables.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A weight distribution hitch for use with a towing vehicle and a trailer coupled to a rear of said towing vehicle, said weight distribution hitch comprising:
   a vehicle attachment portion connectable to said vehicle, said vehicle attachment portion having a sheave rotatable about a rotational axis;
   a first trailer attachment connectable to said trailer;

a second trailer attachment connectable to said trailer;

a cable extending from said first trailer attachment and through said vehicle attachment portion to said second trailer attachment, said cable slidable through said vehicle attachment portion a tensioner, said tensioner connected to said cable for applying said tension, said tensioner has a rotatable take-up drum, said tensioner is affixed to said first trailer attachment, one end of said cable is affixed to said take-up drum, a second end of said cable is affixed to said second trailer attachment, rotation of said take-up drum changes said tension in said cable; and when said vehicle attachment portion is connected to said vehicle and said first and second trailer attachment portions are connected to said trailer, tension in said cable imparts a rotational force between said vehicle and said trailer.

2. The hitch in claim 1, wherein said cable is resiliently elongateable under tension.

3. The hitch in claim 1, wherein said vehicle attachment portion having a fixed portion and a pivoting portion, said sheave located on said pivoting portion, said pivoting portion pivotable about a pivot axis perpendicular to said rotational axis.

4. The hitch in claim 3, wherein said sheave is a center sheave located between outer sheaves, said outer sheaves are closer to said pivot axis than said center sheave, said cable is moveable through said sheaves.

5. The hitch in claim 1, further comprising a stacked receiver having a plurality of vertically arranged receivers, a hitch ball affixed to one of said vertically arranged receivers, said vehicle attachment portion affixed to another of said vertically arranged receivers and spaced from said hitch ball.

6. A weight distribution hitch for attachment to a towing vehicle and a trailer coupled to said towing vehicle through a ball-and-socket connection, when said trailer and towing vehicle are coupled, said trailer is generally pivotable with respect to said vehicle about said ball-and-socket connection in a yaw, pitch, and/or roll direction, said weight distribution hitch comprising:

a shank affixable to said towing vehicle, a hitch ball fixed with respect to said shank, a pulley portion pivotable about a pivot axis, said pivot axis fixed with respect to said shank and spaced from said hitch ball;

a cable extending through said pulley portion, said cable having a first end and a second end, said cable slidable through said pulley portion between said first and second ends;

a trailer frame attachment for attaching said first end of said cable with respect to said trailer;

an adjustable tensioner for attaching said second end of said cable with respect to said trailer;

when said trailer is coupled to said hitch ball, said trailer frame attachment is attached to said trailer, and said adjustable tensioner is attached to said trailer, tension in said cable imparts a rotational force on said shank in said pitch direction; and when said trailer pivots with respect to said vehicle in said yaw direction, said cable slides through said pulley portion.

7. The hitch in claim 6, wherein said cable is resiliently elongateable.

8. The hitch in claim 6, wherein said adjustable tensioner has a rotatable take-up drum, said second end of said cable is affixed to said take-up drum, rotation of take-up drum changes said tension in said cable.

9. The hitch in claim 6, further comprising a spring connected to said cable.

10. The hitch in claim 6, further comprising a spring located between said shank and said pulley portion.

11. The hitch in claim 6, wherein said pulley portion has a rotatable sheave, said cable contacting said sheave.

12. The hitch in claim 6, wherein said pulley portion has a center sheave and a pair of outer sheaves, said sheaves each being rotatable about a corresponding rotational axis, said cable contacting said sheaves.

13. A weight distribution hitch for use with a trailer connected to a towing vehicle at a coupler, said weight distribution hitch comprising:

a vehicle attachment portion for being fixed with respect to said vehicle;

a trailer attachment portion for being fixed with respect to said trailer;

a cable having a first end and a second end, said cable extending between said vehicle attachment portion and said trailer attachment portion, said first and second ends affixed to one of said vehicle attachment portion or said trailer attachment portion, said cable passing through the other of said vehicle attachment portion or said trailer attachment portion;

a sheave where said cable passes through other of said vehicle attachment portion or said trailer attachment portion, said sheave is rotatable about a rotational axis; and wherein tension in said cable creates a rotational force about said vehicle attachment portion.

14. The weight distribution hitch in claim 13, further comprising a tensioner in contact with said cable.

15. The weight distribution hitch in claim 13, wherein said vehicle attachment portion is spaced from said coupler.

16. The weight distribution hitch in claim 13, wherein said cable is resilient.

17. The weight distribution hitch in claim 13, wherein said sheave is pivotable about a pivot axis, said pivot axis is perpendicular to said rotational axis.

18. A weight distribution hitch for use with a towing vehicle and a trailer coupled to a rear of said towing vehicle, said weight distribution hitch comprising:

a vehicle attachment portion connectable to said vehicle, said vehicle attachment portion having a sheave rotatable about a rotational axis, said vehicle attachment portion having a fixed portion and a pivoting portion, said sheave located on said pivoting portion, said pivoting portion pivotable about a pivot axis perpendicular to said rotational axis;

a first trailer attachment connectable to said trailer;

a second trailer attachment connectable to said trailer;

a cable extending from said first trailer attachment and through said vehicle attachment portion to said second trailer attachment, said cable slidable through said vehicle attachment portion; and when said vehicle attachment portion is connected to said vehicle and said first and second trailer attachment portions are connected to said trailer, tension in said cable imparts a rotational force between said vehicle and said trailer.

19. The hitch in claim 18, wherein said sheave is a center sheave located between outer sheaves, said outer sheaves are closer to said pivot axis than said center sheave, said cable is moveable through said sheaves.

20. A weight distribution hitch for use with a towing vehicle and a trailer coupled to a rear of said towing vehicle, said weight distribution hitch comprising:

a vehicle attachment portion connectable to said vehicle, said vehicle attachment portion having a sheave rotatable about a rotational axis;
a first trailer attachment connectable to said trailer;
a second trailer attachment connectable to said trailer;
a cable extending from said first trailer attachment and through said vehicle attachment portion to said second trailer attachment, said cable slidable through said vehicle attachment portion;
when said vehicle attachment portion is connected to said vehicle and said first and second trailer attachment portions are connected to said trailer, tension in said cable imparts a rotational force between said vehicle and said trailer; and
a stacked receiver having a plurality of vertically arranged receivers, a hitch ball affixed to one of said vertically arranged receivers, said vehicle attachment portion affixed to another of said vertically arranged receivers and spaced from said hitch ball.

* * * * *